United States Patent
Sturt (10) Patent No.: US 6,736,459 B1
(45) Date of Patent: May 18, 2004

(54) SPRING ELEMENT SEAT

(75) Inventor: Alan Sturt, West Bloomfield, MI (US)

(73) Assignee: Lear Corporation, Southfield, MI (US)

(*) Notice: Subject to any disclaimer, the term of this patent is extended or adjusted under 35 U.S.C. 154(b) by 26 days.

(21) Appl. No.: 10/249,543

(22) Filed: Apr. 17, 2003

(51) Int. Cl.[7] ................................................ B60N 2/02
(52) U.S. Cl. ................................. 297/378.1; 297/452.53
(58) Field of Search ........................ 297/452.63, 452.54, 297/452.53, 452.52, 378.1, 452.18, 284.2, 284.1, 340, 341

(56) References Cited

U.S. PATENT DOCUMENTS

| | | | | |
|---|---|---|---|---|
| 1,203,293 A | * | 10/1916 | Wilkinson | |
| 2,274,176 A | * | 2/1942 | Widman | |
| 2,833,339 A | * | 5/1958 | Liljengren | |
| 2,855,984 A | * | 10/1958 | Majorana et al. | |
| 3,271,076 A | * | 9/1966 | Smith | |
| 3,416,839 A | * | 12/1968 | Flint | |
| 3,967,852 A | * | 7/1976 | Eiselt et al. | |
| 3,992,059 A | * | 11/1976 | Kloepfer | |
| 4,368,916 A | * | 1/1983 | Blasin | |
| 5,385,389 A | * | 1/1995 | Bishai | |
| 5,397,167 A | | 3/1995 | Fourrey et al. | 297/354.13 |
| 5,730,495 A | | 3/1998 | Tuman, II | 297/331 |
| 6,174,017 B1 | | 1/2001 | Salani et al. | 296/65.03 |
| 6,371,558 B1 | | 4/2002 | Couasnon | 297/378.1 |
| 6,375,255 B1 | | 4/2002 | Maruta et al. | 297/15 |
| 2002/0041121 A1 | | 4/2002 | Takata | 297/378.1 |
| 2002/0125753 A1 | | 9/2002 | Kammerer | 297/331 |
| 2002/0185904 A1 | | 12/2002 | Carlson et al. | 297/378.12 |

* cited by examiner

Primary Examiner—Milton Nelson, Jr.
(74) Attorney, Agent, or Firm—Bill C. Panagas (57) ABSTRACT

There is disclosed a folding seat assembly which provides a contoured seat for increased comfort of the occupant while at the same time providing a very thin profile seat when folded into a cargo position.

20 Claims, 6 Drawing Sheets

SPRING ELEMENT SEAT

BACKGROUND OF THE INVENTION

1. Field of the Invention

The present invention generally relates to an automobile seat and, more specifically, to an improved automobile contoured profile seat having the capability of being set into a horizontal position having a flat substantially contour free profile.

2. Description of the Related Art

Provision for having a third row of seats in utility, sport vehicles as well as in vans is common practice. The desire to make this third row of seats removable or capable of folding to allow the space occupied by the third row seats to be used as cargo space is also known. Current seats have fixed contours so a full contour seat produces a high folded condition whereas a low folded height demands a flat contour which is uncomfortable to the seat occupant in its upright position.

For example, U.S. Pat. No. 5,397,167 issued Mar. 14, 1995 to Fourrey et al teaches a seat assembly utilizing a scissor-type support system having a number of preset seat positions.

U.S. Pat. No. 5,730,495 issued Mar. 24, 1998 to Tuman, II teaches a folding seat having a folding hip restraint system and also having a seat which can be folded forward to access the area behind the seat and folded backward to access the area under the seat.

U.S. Pat. No. 6,174,017 issued Jan. 16, 2001 to Salani et al teaches a folding seat that has a back that folds forward and down and a seat cushion that folds forward and upward to store the folded seat in a vertical position.

U.S. Pat. No. 6,371,558 issued Apr. 16, 2002 to Couasnon teaches a folding seat assembly where the seat back is folded over the seat cushion.

U.S. Pat. No. 6,375,255 issued Apr. 23, 2002 to Maruta et al teaches a folding seat assembly where the seat back is folded over the seat cushion and then the folded seat is moved into a floor pan storage depression.

U.S. Published Patent Application No. 2002/0041121 published Apr. 11, 2002 to Takata teaches folding seat assembly where the seat back folds into the seat cushion area.

U.S. Published Patent application No. 2002/0125753 published Sep. 12, 2002 to Kammerer teaches a folding seat assembly where the seat cushion folds upward and forward and the seat back moves laterally forward without folding.

U.S. Published Patent application No. 2002/0185904 published Dec. 12, 2002 to Carlson et al teaches a seat hinge which allows the seat back to be moved and locked in several positions.

DISCLOSURE OF THE INVENTION

The present invention provides advantages and alternatives over the prior art by providing a folding vehicle passenger seat that provides a contoured seating area for a passenger but upon being folded into a storage position changes contour to provide a flatter thinner folded seat.

According to a further aspect of the present invention there is provided a high contour seat assembly that has the ability to change the seat contour to substantially no contour when the seat is in a folded position.

According to yet another aspect of the present invention there is provided a folding seat assembly for a vehicle having a floor, comprising: a seat cushion assembly comprising; seat cushion frame consisting of a rear frame member, and two parallel spaced apart side frame members, said side frame members and said rear frame member being permanently attached by a permanent attachment means, said side members further described as having correspondingly positioned bores in desired positions along said side members for mounting pivoting spring anchor mounts, a seat back assembly, a seat locking assembly and a connector bar, and said rear frame member having a plurality of bores in desired locations for the mounting of the distal ends of contour springs and passage of a seat locking assembly release assembly member; at least one pivoting spring anchor mounted between said parallel spaced apart side frame members at the front ends of said side frame members by an attachment means; a contour spring having a proximal end having at least one member and a distal end, said distal end mounted to said rear seat member by an attachment means, and said proximal end members attached to at least one pivoting spring anchor by an attachment means; a seat back assembly comprising: a seat back frame having a top end and a pair of spaced apart side members, and a proximal end seat back contour spring mounting member, and having corresponding bores in the distal ends of said spaced apart side members for mounting a connector bar and for mounting said seat back assembly to said seat cushion assembly; a contour spring having a proximal end having at least one member and a distal end, said distal end mounted to said rear seat member by an attachment means, and said proximal end members mounted to said seat back contour spring mounting member by an attachment means; at least one connector bar having a proximal end and a distal end, said proximal end attached to a pivoting seat mount arm by moveable attachment means, said seat mount arm having two ends and mounted at one end to said at least one pivoting spring anchor and at said second end to a vehicle seat mount by moveable mounting means, and said connector bar distal end attached to one of the spaced apart side members of said seat back assembly by moveable attachment means: a seat locking assembly comprising; at least one locking latch mounted on at least one of said seat cushion frame side member by a mounting means and having a locking pin in moveable relationship with a locking bore in said at least one connector bar, further having a release assembly for releasing the seat locking assembly thereby allowing folding of the seat back, and an appropriate seat cushion frame and seat back frame upholstery covering; and mounting said folding seat assembly fixedly to a vehicle floor.

According to a yet further aspect of the present invention A folding seat assembly for a vehicle having a floor, comprising: a seat cushion assembly comprising; seat cushion frame consisting of a rear frame member, and two parallel spaced apart side frame members, said side frame members and said rear frame member being permanently attached by a permanent attachment means, said side members further described as having correspondingly positioned bores in desired positions along said side members for mounting pivoting spring anchor mounts, a seat back assembly, a seat locking assembly and a connector bar, and said rear frame member having a plurality of bores in desired locations for the mounting of the distal ends of contour springs and passage of a seat locking assembly release assembly member at least one pivoting spring anchor mounted between said parallel spaced apart side frame members at the front ends of said side frame members by an attachment means; a contour spring having a proximal end having at least one member and a distal end, said distal end mounted to said rear seat member by an attachment means, and said proximal end members attached to at least one pivoting spring anchor by an attachment means; a seat back assembly comprising: a seat back frame having a top end and a pair of spaced apart side members, and a proximal end seat back contour spring mounting member, and having corresponding bores In the distal ends of said spaced apart side members for mounting a connector bar and for mounting said seat back assembly to said seat cushion assembly; a contour spring having a proximal end having at least one member and a distal end, said distal end mounted to said rear seat member by an attachment means, and said proximal end members mounted to said seat back contour spring mounting member by an attachment means; at least one connector bar having a proximal end and a distal end, said proximal end attached to a pivoting seat mount arm by moveable attachment means, said seat mount arm having two ends and mounted at one end to said at least one pivoting spring anchor and at said second end to a vehicle seat mount by moveable mounting means, and said connector bar distal end attached to one of the spaced apart side members of said seat back assembly by moveable attachment means: a seat locking assembly comprising, at least one locking latch mounted on at least one of said seat cushion frame side member by a mounting means and having a locking pin in moveable relationship with a locking bore in said at least one connector bar, further having a release assembly for releasing the seat locking assembly thereby allowing folding of the seat back, and an appropriate seat cushion frame and seat back frame upholstery covering; and mounting said folding seat assembly moveably on tracks mounted to a vehicle floor.

The present invention thus advantageously provides a high contour folding seat assembly which is capable of folding into a substantially contour free thin folded seat providing for less space to be taken up by the high contour folding seat assembly in the folded position than would be normal for such a high contour folding seat assembly

DETAILED DESCRIPTION

Figure 1:
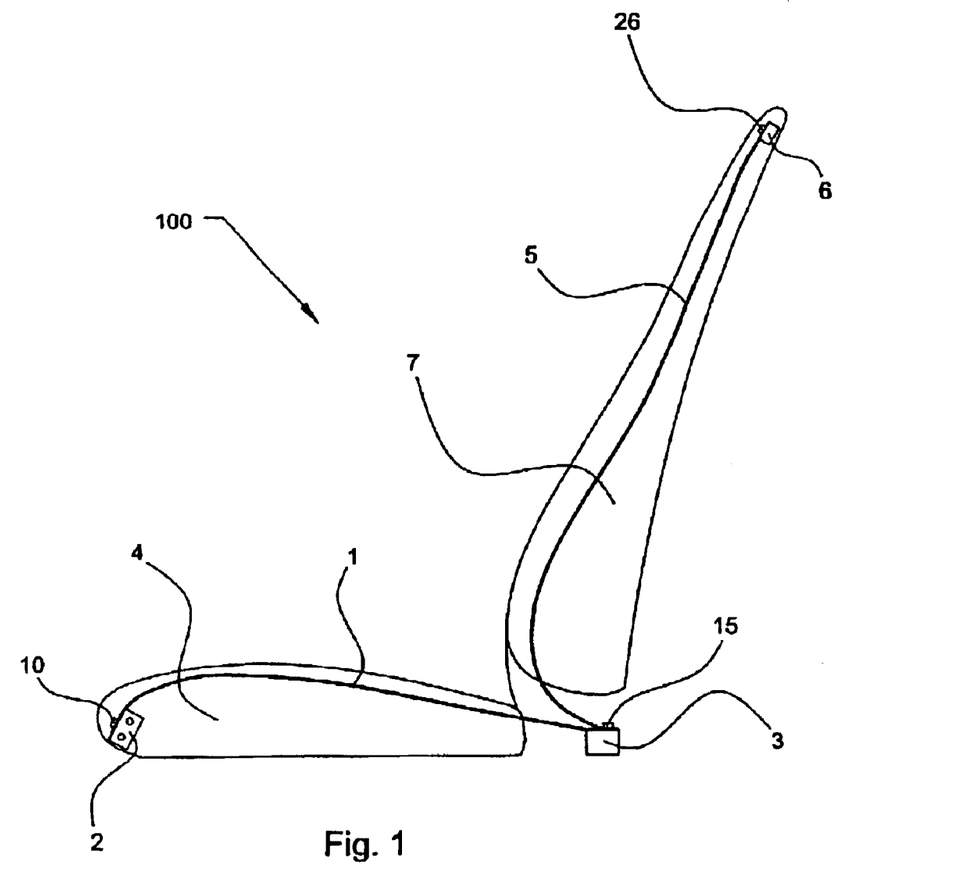
FIG. 1 shows a plan section side view of a high contour seat of the present invention in the upright or seating position.

Reference will now be made to the drawings, wherein to the extent possible like reference numerals are utilized to designate like components throughout the various views. Referring to FIG. 1, there is presented a plan section side view of one preferred embodiment of seat 100 of the present invention in an upright or seating position.

As further shown in FIG. 1 the seat 100 comprises a seat cushion 4 having disposed therein a seat cushion contour spring 1 attached at its forward or proximal end to pivoting spring anchor 2 by attaching means 10 and at its rearward or distal end to back member 31 of seat cushion frame 3 by attaching means 15. Also shown is seat back 7 having disposed therein a seat back contour spring 5 attached at its upper or proximal end to seat back fixed spring anchor 6 by attaching means 26 and attached at its bottom or distal end to back member 31 (FIG. 7) of seat cushion frame 3 by attaching means 15.

Figure 2:
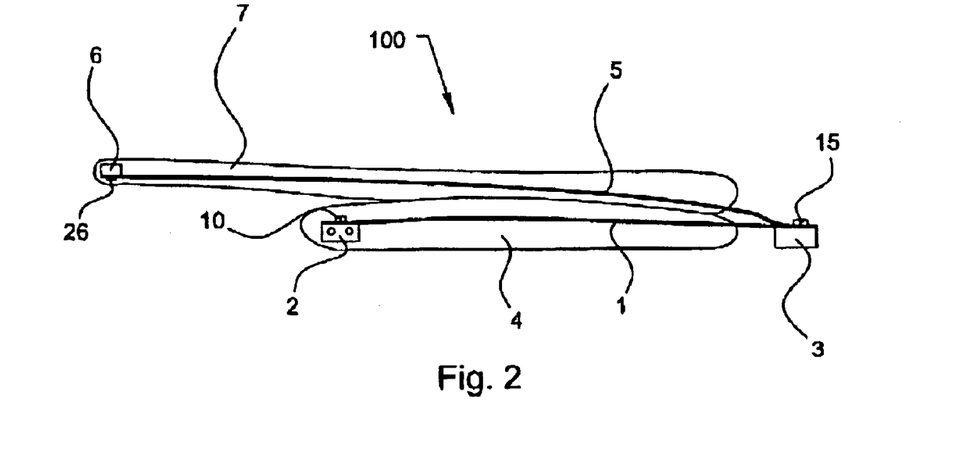
FIG. 2 shows a plan section side view of a high contour seat of the present invention with the contour removed and the seat in the folded or cargo space position.

Referring now to FIG. 2, there is shown a plan section side view of seat 100 of the present invention in a folded or cargo position. Folding the seat back 7 forward and downward causes the seat back contour spring 5 to straighten flattening the contour of seat back 7 to a flatter, slimmer profile. At the same time the forward and downward movement of seat back 7 and seat back contour spring 5 causes the movement of connector bar 8 (FIG. 3) forward causing pivoting spring anchor 2 to move forward and rotate 90° clockwise on pivot 12 (FIG. 3) straightening seat cushion contour spring 1 and flattening the contour of seat cushion 4 into a slimmer profile. Also shown is spring attaching means 10, 15 and 26. The result is a seat assembly that has substantially less thickness and substantially less seat contour when it is in the folded or cargo position. This in turn provides more cargo space over the folded seat assembly. Whereas In the upright or seating position the contour of the seat cushion and the seat back is increased to improve the comfort of an occupant of the seat.

Figure 3:
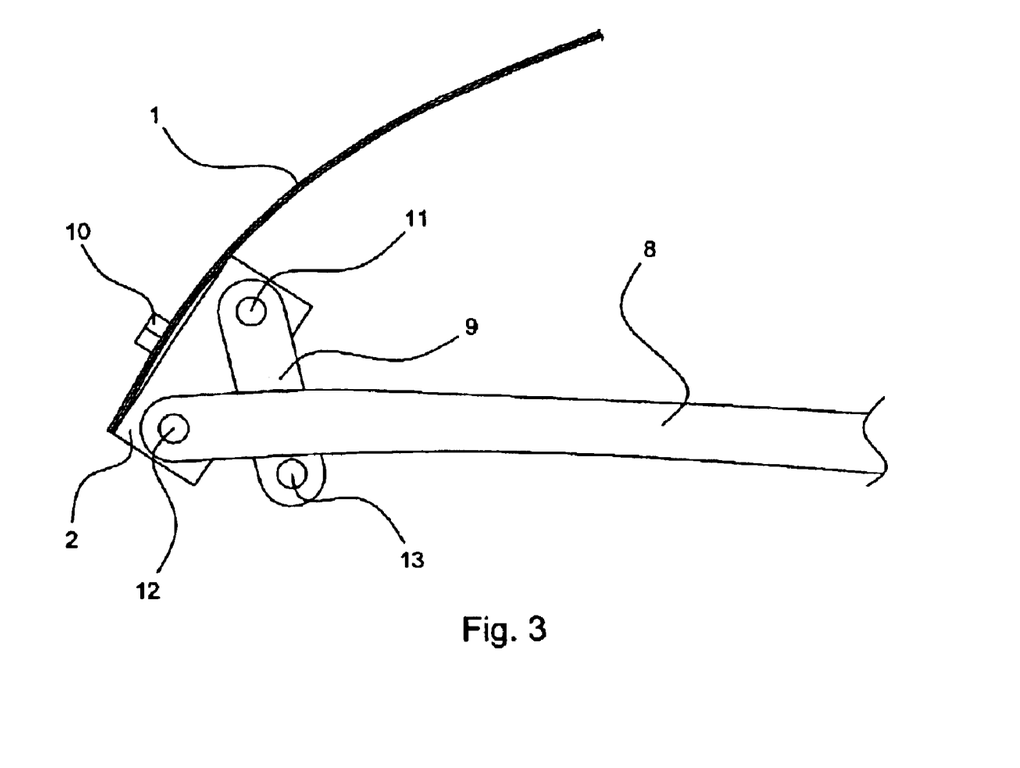
FIG. 3 shows a plan side view of a preferred embodiment of the seat front folding assembly of the present invention.
Figure 8:
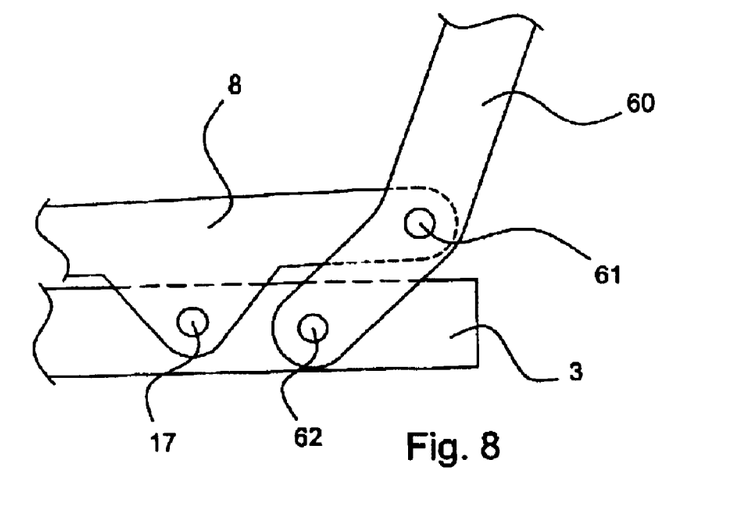
FIG. 8 shows a partial section view of the seat rear folding assembly of the present invention.

Turning now to FIG. 3 there is shown a plan seat front partial side view of the pivoting-spring anchor 2 pivoting assembly comprising a connector bar 8 connected at its forward or proximal end to pivoting spring anchor 2 at its lower or forward end at pivot point 12 and at its rearward or distal end to seat back frame 60 (FIG. 8). A seat mount arm 9 Is mounted in a pivoting manner at its upper end to the upper or rearward end of pivoting spring anchor 2 at pivot point 11 and at its lower end to a vehicle seat mount (not shown) at pivot point 13.

Figure 4:
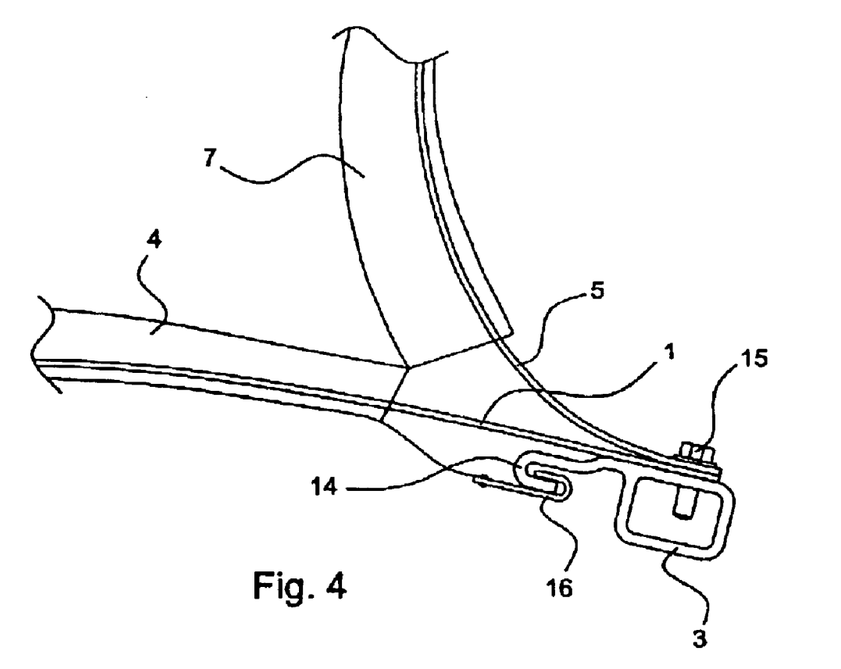
FIG. 4 shows a partial plan section side view of the connection point of the seat springs and seat cushion cover.

FIG. 4 shows a plan partial section view of the seat cushion spring i and seat back spring 5 connecting to the rear end or edge of the seat cushion frame 3 by spring connecting means 15. Also shown is a clip type attaching means 16 attached to clip attachment means 14 of seat cushion frame 3. Clip type attaching means 16 secures the seat cushion 4 in position on seat cushion frame 3. Also shown is seat back cushion 7.

Figure 5:
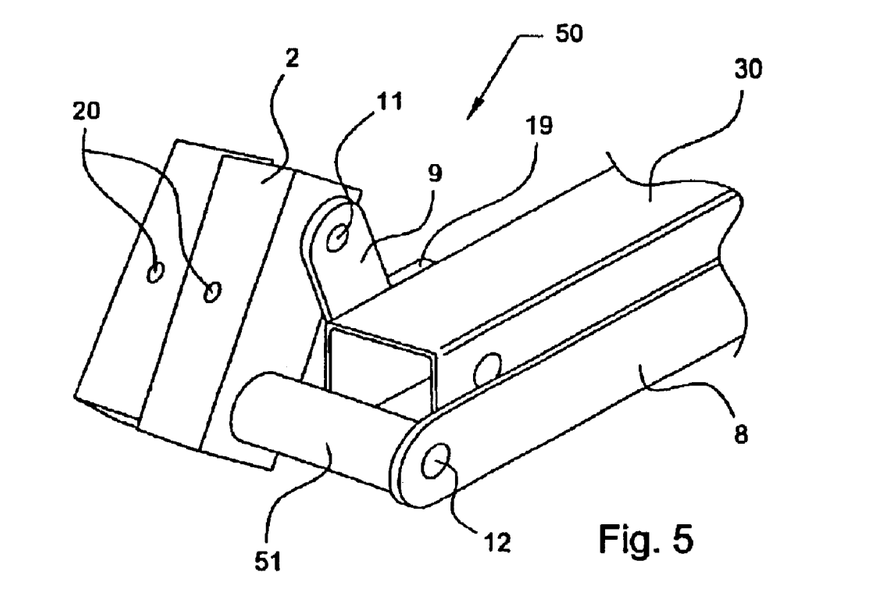
FIG. 5 shows a perspective partial view of the seat front end folding assembly.
Figures 11, 12:
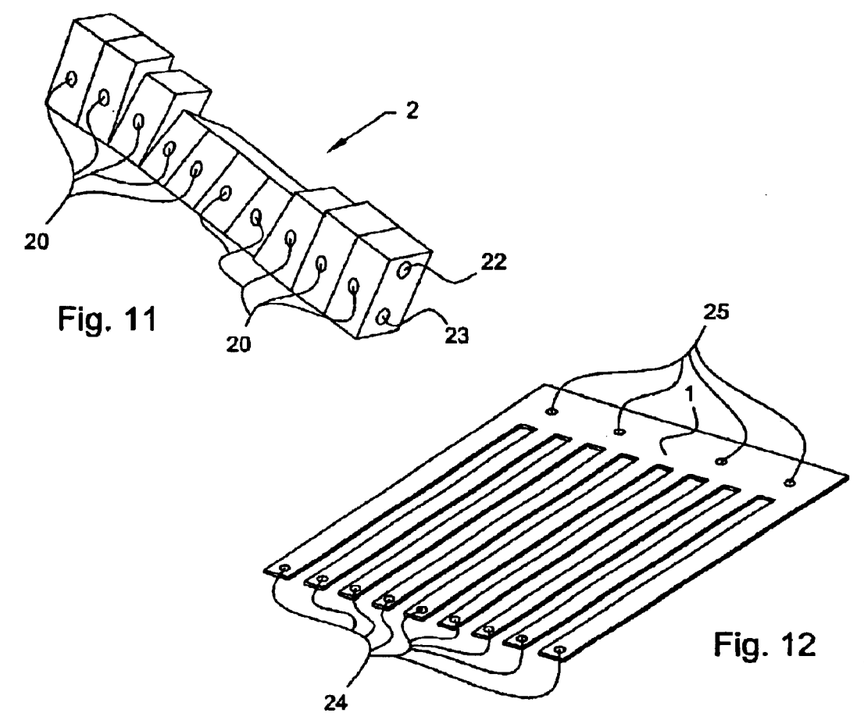
FIG. 11 shows a perspective view on one preferred embodiment of the seat front seat spring attachment means.
FIG. 12 shows a perspective view of one preferred seat cushion spring of the present invention.

FIG. 5 shows a partial perspective view of the seat cushion frame side member 3 front corner 50 with a plurality of spring front attaching means 2, connector bar 8 front or proximal end having a bore 12 for connecting spring front attaching means 2 to said connector bar 8 using spacer means 51. The plurality of spring front attaching means 2 also connected to seat mount arm 9 by an attachment means (not shown) through seat mount arm bore 11 and spring front attachment means bore 22 (FIG. 11). Each of said plurality of spring front attaching means 2 having a spring front attaching means bore 20. A front portion of side member 30 is also shown. The attaching means are not shown but are well known in the art and need no further clarification here.

Figure 6:
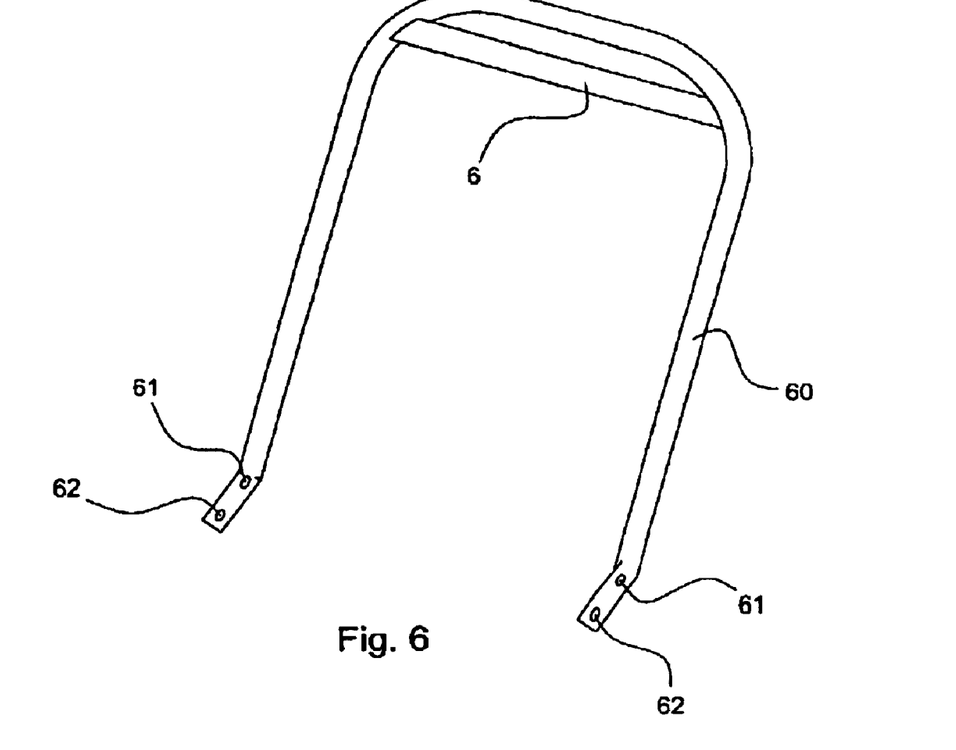
FIG. 6 shows a perspective view of one preferred seat back frame of the present invention.

In FIG. 6 is shown one embodiment of a seat back frame 60 having a spring upper or proximal end attaching area 6 and further having a bore 61 for attaching said seat back frame 60 to the connector bar 8 (FIG. 8) and bore 62 for connecting seat back frame 60 to the rear of seat cushion frame 3.

Figure 7:
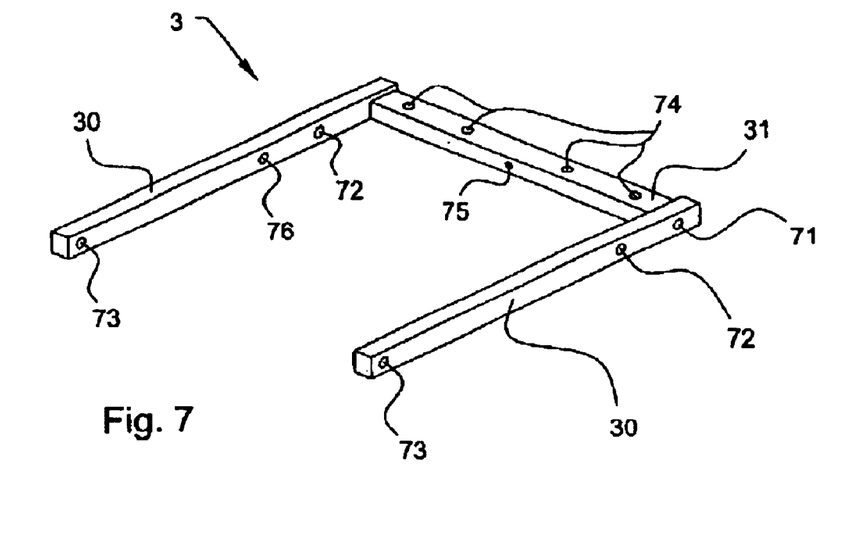
FIG. 7 shows a perspective view of one preferred seat cushion frame of the present invention.

In FIG. 7 is shown one embodiment of a seat cushion frame 3 having a pair of parallel spaced apart side members 30 held in parallel spaced relationship by back member 31 and having along its back member 31 spring rear attaching bores 74, attaching, bores 73 on the front or proximal end or edge of each side members 30 of seat cushion frame 3 for mounting said seat mount arms 9, bores 71 located on each side member 30 for attaching seat back 60 distal or bottom ends to said seat cushion frame 3, bores 76 on each side member 30 for mounting a locking means 85 (FIG. 10) on each said side member 30, and bores 72 on each side member 30 allowing the locking means 85 locking pin 84 to lock the seat back in a upright or seating position. Also shown is bore 75 through the rear member 31 of seat cushion frame 3 for passage of a locking means release cable 83 (FIG. 9).

Turning now to FIG. 8 there is shown a partial plan view of the rear corner of the seat of the present invention showing the seat back 60 attached to seat cushion frame 3 through bore 62 and further attached to connector bar 8 through bore 61 (attaching means not shown). Also shown is connector bar 8 locked to seat cushion frame 3 through bore 17 by locking means not shown.

Figure 9:
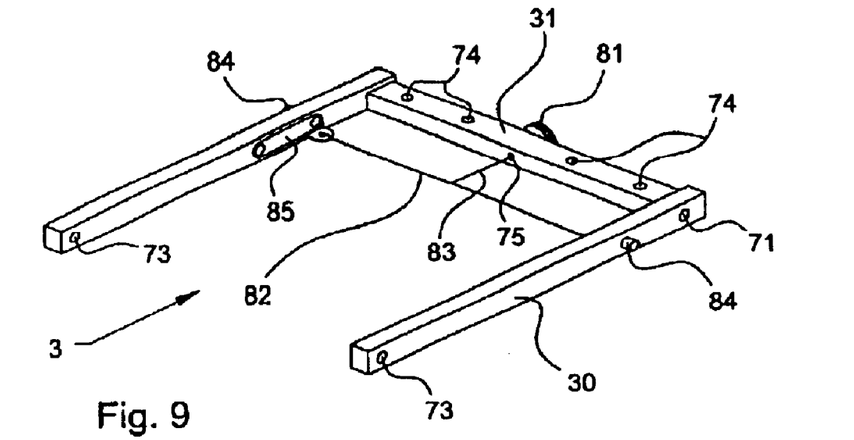
FIG. 9 shows a perspective view of one preferred seat cushion frame with one embodiment of a seat locking assembly of the present invention.

FIG. 9 shows a perspective view of the seat cushion frame 3 having a pair of parallel spaced apart side members 30 connected by a rear-member 31. Rear member 31 has a plurality of bores 74 for mounting seat cushion contour spring 1 and seat back contour spring 5 as well as a bore 75 to allow passage of the seat locking control assembly to seat lock release knob 81. Each of said side members 30 have bore 73 at their front or proximal ends for mounting of pivoting spring anchors 2, bore 71 for mounting seat back frame 60 in folding relationship with seat cushion frame 3, and bore 72 (shown here filled by locking pin 84) for passage of the seat locking pin 84 therethrough. Also shown is a preferred embodiment of a seat back locking assembly comprising; a pair of seat back locking pin latches connected by a release connection cable 82 and to a release knob cable 83 to release knob 81. In practice the locking pin 84 passes through seat cushion frame member 30 via bore 72 and through bore 17 of connector bar 8 thereby locking the seat back 7 and seat cushion 4 In a passenger seating position. Pulling on release knob 81 causes the locking pins 84 to be retracted from bores 17 such that pushing forward on seat back 7 causes the seat back to fold to a down or storage position, simultaneously moving connector bar 8 forward causing the seat cushion contour spring land the seat back contour spring 5 to straighten out creating a much slimmer, flatter profile folded seat.

Figure 10:
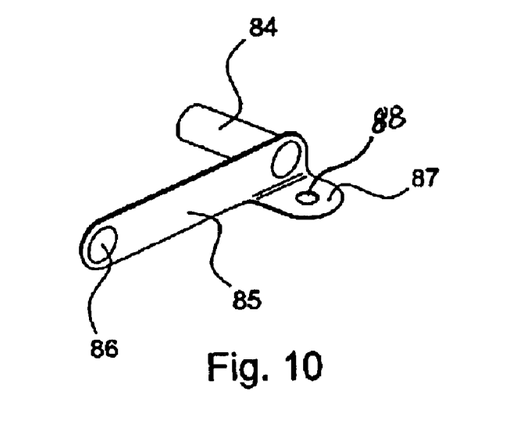
FIG. 10 shows a perspective view of one preferred seat locking assembly locking means of the present invention.

In FIG. 10 is shown an enlarged detail perspective view of locking pin bracket 85 having a locking pin 84 a mounting bore 86 to allow mounting of said locking pin bracket to the seat cushion side member 30 and release cable tab 87 having a bore 88 to allow attachment of release connection cable 82 by an attachment means not shown but well known in the art and needing no further discussion here.

Turning to FIG. 11 there is shown one embodiment of pivoting spring anchors 2 of the present invention which each have a seat cushion contour spring front mounting bore 20, a bore 22 for mounting said pivoting spring anchors to seat mount arm 9 by an attachment means not shown but well understood in the art. Also shown is seat frame mounting bore 23 for mounting the pivoting spring anchors 2 to the front or proximal ends of seat cushion side members 30 via bores 73 and spacer means 51 by connecting means not shown but well known in the relevant art.

FIG. 12 shows a perspective view of one preferred embodiment of a seat cushion contour spring 1 having a plurality of mounting bores 25 for mounting said seat cushion contour spring 1 rear or distal end to the seat cushion rear frame member 31 and a plurality of spring elements each said spring member having a bore 24 for mounting the seat cushion spring front or proximal member ends to pivoting spring anchors 2.

Figure 13:
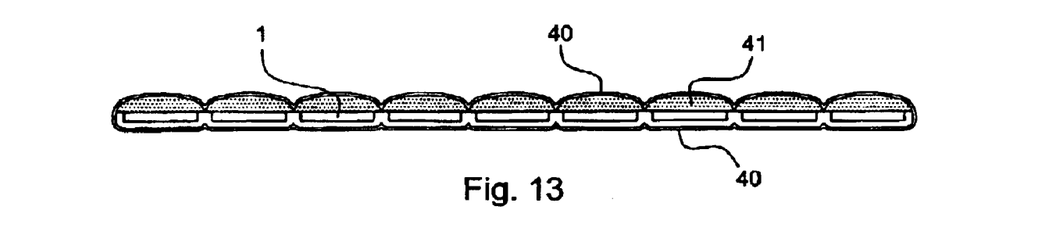
FIG. 13 shows a section plan view of one preferred assembled seat cushion and seat cushion spring of the present invention.

FIG. 13 shows section plan view of one preferred embodiment of the folding seat of the present invention with the seat cushion seat contour spring 1 encased in a seat cover having an outer fabric 40 and an interior cushioning material 41. The seat cover and interior cushioning material being sewn into pocket-like structures to house the individual seat cushion contour spring 1 members.

Figure 14:
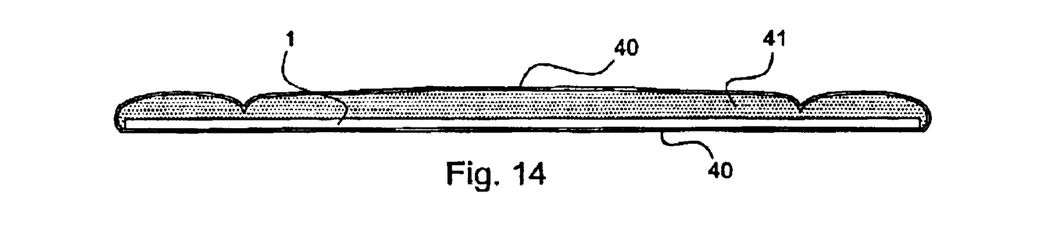
FIG. 14 shows a section plan view of another preferred assembled seat cushion and seat cushion spring of the present invention.

Turning now to FIG. 14 there is shown a section plan view of another preferred embodiment of the folding seat of the present invention with the seat cushion seat contour spring 1 encased in a seat cover having an outer fabric 40 and an interior cushioning material 41 where the seat cushion spring 1 has a single member.

Interior cushion materials may be any commonly known and used in the art with foam being the presently preferred material. Likewise, outer fabric 40 may be any commonly used and well known in the art. Additionally, the outer fabric 40 and interior cushioning material 41 may be formed as a single unit or may be separate units later assembled together. Suitable seat cushion and seat back materials include, for example, a cover cloth, foam, and backing scrim combination as well as others well known in the pertinent art.

Suitable spring materials are well known in the art and include, for example, spring steel, preferably having a thickness of from about 0.5 mm to 1.5 mm, reinforced plastic, preferably having a thickness of from about 1.5 mm to 3.0 mm thick. The width of each spring element is preferably from about 25 mm to about 350 mm. And it is to be understood that the spring elements may also be round in geometry and have a diameter of from about 3 mm to about 8 mm. The presently preferred spring material is spring steel.

In practice, the opening of the seat back into a seating position causes the contour springs in the seat back and in the seat cushion to bend or flex and provide the seat contour for the comfort of the occupant. Folding the seat back into the folded or cargo position causes the contour springs in the seat back and in the seat cushion to straighten and decrease or remove the contour of the seat assembly substantially reducing the cross-sectional thickness of the seat assembly thereby providing more cargo area over the folded seat.

The seats of the present invention may be mounted in a vehicle by known means either permanently, removably, and/or moveably with the understanding that the front seat anchor must be mounted to allow for movement during seat position changes. Such mounting methods are well understood in the art.

Although the preferred embodiments of the present invention has been disclosed, various changes and modifications may be made without departing from the scope of the invention as set forth in the appended claims.

What is claimed is:

1. A folding seat assembly for mounting to a vehicle floor, comprising:
   A) a seat cushion assembly comprising;
      1) seat cushion frame consisting of a rear frame member, and two parallel spaced apart side frame members, said side frame members and said rear frame member being permanently attached by a permanent attachment means, said side members further described as having correspondingly positioned bores in desired positions along said side members for mounting pivoting spring anchor mounts, a seat back assembly, a seat locking assembly and a connector bar, and said rear frame member having a plurality of bores in desired locations for mounting of a contour spring and for passage of a seat locking assembly release assembly member;
      2) at least one pivoting spring anchor mounted between said parallel spaced apart side frame members at the front ends of said side frame members by an attachment means;
      3) a contour spring having a proximal end having at least one member and a distal end, said distal end mounted to said rear frame member by an attachment means, and said proximal end attached to at least one pivoting spring anchor by an attachment means;
   B) a seat back assembly comprising:
      1) a seat back frame having a top end and a pair of spaced apart side members, and a proximal end seat back contour spring mounting member, and having corresponding bores in said spaced apart side members for mounting a connector bar and for mounting said seat back assembly to said seat cushion assembly;
      2) a contour spring having a proximal end having at least one member and a distal end, said distal end mounted to said rear frame member by an attachment means, and said proximal end members mounted to said seat back contour spring mounting member by an attachment means;
   C) at least one connector bar having a proximal end and a distal end, said proximal end attached to a pivoting seat mount arm by moveable attachment means, said seat mount arm having two ends and mounted at one end to said at least one pivoting spring anchor and the other end to a vehicle seat mount by moveable mounting means, and said connector bar distal end attached to one of the spaced apart side members of said seat back assembly by moveable attachment means;
   D) a seat locking assembly comprising; at least one locking latch mounted on at least one of said seat cushion frame side members by a mounting means and having a locking pin in moveable relationship with a locking bore in said at least one connector bar, further having a release assembly for releasing the seat locking assembly thereby allowing folding of the seat back frame, and
   E) an appropriate seat cushion frame and seat back frame upholstery covering.

2. The folding seat assembly as claimed in claim 1 wherein, there are two connector bars and two seat locking assemblies.

3. The folding seat assembly as claimed in claim 1 wherein, said contour springs comprise spring steel having a thickness of from about 0.5 mm to about 1.5 mm.

4. The folding seat assembly as claimed in claim 1 wherein, said contour springs comprises reinforced plastic having a thickness of from about 1.5 mm to about 3.0 mm.

5. The folding seat assembly as claimed in claim 1 wherein, said contour springs have a single proximal end member.

6. The folding seat assembly as claimed in claim 1 wherein, said contour springs have a plurality of proximal end members.

7. The folding seat assembly as claimed in claim 6 wherein, said contour springs proximal end members each has a width of from about 25 mm to about 350 mm.

8. The folding seat assembly as claimed in claim 6 wherein, said contour springs proximal end members are round and have a diameter of from about 3 mm to about 8 mm.

9. The folding seat assembly as claimed in claim 1 wherein, said seat cushion frame and said seat back frame is fabricated of metal.

10. The folding seat assembly as claimed in claim 1 wherein, said seat cushion frame and said seat back frame is fabricated of reinforced plastic.

11. A folding seat assembly for mounting to a vehicle floor, comprising:
    A) a seat cushion assembly comprising;
       1) seat cushion frame consisting of a rear frame member, and two parallel spaced apart side frame members, said side frame members and said rear frame member being permanently attached by a permanent attachment means, said side members further described as having correspondingly positioned bores in desired positions along said side members for mounting pivoting spring anchor mounts, a seat back assembly, a seat locking assembly and a connector bar, and said rear frame member having a plurality of bores in desired locations for mounting of a contour springs and for passage of a seat locking assembly release assembly member;
       2) at least one pivoting spring anchor mounted between said parallel spaced apart side frame members at the front ends of said side frame members by an attachment means;
       3) a contour spring having a proximal end having at least one member and a distal end, said distal end mounted to said rear seat member by an attachment means, and said proximal end attached to at least one pivoting spring anchor by an attachment means;
    B) a seat back assembly comprising:
       1) a seat back frame having a top end and a pair of spaced apart side members, and a proximal end seat back contour spring mounting member, and having corresponding bores in said spaced apart side members for mounting a connector bar and for mounting said seat back assembly to said seat cushion assembly;
       2) a contour spring having a proximal end having at least one member and a distal end, said distal end mounted to said rear seat member by an attachment means, and said proximal end members mounted to said seat back contour spring mounting member by an attachment means;

C) at least one connector bar having a proximal end and a distal end, said proximal end attached to a pivoting seat mount arm by moveable attachment means, said seat mount arm having two ends and mounted at one end to said at least one pivoting spring anchor and the other end to a vehicle seat mount by moveable mounting means, and said connector bar distal end attached to one of the spaced apart side members of said seat back assembly by moveable attachment means;

D) a seat locking assembly comprising; at least one locking latch mounted on at least one of said seat cushion frame side members by a mounting means and having a locking pin in moveable relationship with a locking bore in said at least one connector bar, further having a release assembly for releasing the seat locking assembly thereby allowing folding of the seat back frame, and E) an appropriate seat cushion frame and seat back frame upholstery covering.

12. The folding seat assembly as claimed in claim 11 wherein, there are two connector bars and two seat locking assemblies.

13. The folding seat assembly as claimed in claim 11 wherein, said contour springs comprise spring steel having a thickness of from about 0.5 mm to about 1.5 mm.

14. The folding seat assembly as claimed in claim 11 wherein, said contour springs comprises reinforced plastic having a thickness of from about 1.5 mm to about 3.0 mm.

15. The folding seat assembly as claimed in claim 11 wherein, said contour springs have a single proximal end member.

16. The folding seat assembly as claimed in claim 11 wherein, said contour springs have a plurality of proximal end members.

17. The folding seat assembly as claimed in claim 16 wherein, said contour springs proximal end members each has a width of from about 25 mm to about 350 mm.

18. The folding seat assembly as claimed in claim 16 wherein, said contour springs proximal end members are round and have a diameter of from about 3 mm to about 8 mm.

19. The folding seat assembly as claimed in claim 11 wherein, said seat cushion frame and said seat back frame is fabricated of metal.

20. The folding seat assembly as claimed in claim 11 wherein, said seat cushion frame and said seat back frame is fabricated of reinforced plastic.

* * * * *